Nov. 23, 1965 G. A. HEMPEL 3,219,225
MULTI-PART CATHODE-RAY CONE
Filed May 21, 1963 6 Sheets-Sheet 1

INVENTOR.
Gustav A. Hempel
BY Green, McCallister & Miller
HIS ATTORNEYS

Nov. 23, 1965 G. A. HEMPEL 3,219,225
MULTI-PART CATHODE-RAY CONE
Filed May 21, 1963 6 Sheets-Sheet 2

INVENTOR.
Gustav A. Hempel
BY Green, McCallister & Miller
HIS ATTORNEYS

Nov. 23, 1965  G. A. HEMPEL  3,219,225
MULTI-PART CATHODE-RAY CONE
Filed May 21, 1963  6 Sheets-Sheet 3

INVENTOR.
Gustav A. Hempel
BY
Green, McCallister & Miller
HIS ATTORNEYS

INVENTOR.
Gustav A. Hempel

Nov. 23, 1965

G. A. HEMPEL 3,219,225

MULTI-PART CATHODE-RAY CONE

Filed May 21, 1963

INVENTOR.
Gustav A. Hempel
BY Green, McCallister & Miller
HIS ATTORNEYS

Nov. 23, 1965     G. A. HEMPEL     3,219,225

MULTI-PART CATHODE-RAY CONE

Filed May 21, 1963     6 Sheets-Sheet 6

INVENTOR.
Gustav A. Hempel

BY Green, McCallister & Miller

HIS ATTORNEYS

United States Patent Office 3,219,225
Patented Nov. 23, 1965

3,219,225
MULTI-PART CATHODE-RAY CONE
Gustav A. Hempel, Pittsburgh, Pa., assignor to McDowell Manufacturing Company, Pittsburgh, Pa., a corporation of Pennsylvania
Filed May 21, 1963, Ser. No. 281,927
10 Claims. (Cl. 220—2.3)

This invention relates to a rectangular, multi-part cathode ray tube, cone or envelope and particularly, to a tube whose body has two parts, such that it may be utilized for color television as a composite tube construction with a glass face plate.

Cathode ray tubes especially designed for color television utilization are being demanded in increasing quantities by reason of the improved picture, the lessened cost of color sets and more color programming, such that they are now more competitive with ordinary black and white sets.

Previous to my invention, metal tube bodies have been successfully made and employed for black and white television sets. However, tube bodies or envelopes for color sets have, to the best of my knowledge, to date been only made from glass and of cone shape. This, of course, is a disadvantage, since a camera takes a rectangular picture and it is customary to frame the transmitting picture to a rectangular shape which may be partially inscribed by the circular edge of the face plate and, as a result, a portion of the picture as transmitted may be lost about the bounding circular corners of the face plate. If an attempt is made to circumscribe a rectangle within the bounding circular edge of the face plate, the resultant size of the picture is reduced.

The construction of a so-called color television tube is much more complex than an ordinary black and white tube, since it is of multi-part construction as to its body, in order that one part which carries the face plate may be properly treated on its inside with phosphorescent colors, such as the three primary colors, and in order that a mask may be inserted between such part and the main body part which terminates in a neck-receiving flange. It is customary to apply the color solutions individually and bake them in place by an infrared lamp. However, the construction of the particular part receiving such treatment should be such as to permit excess solution to drain-off before the baking operations. In addition, the two parts must be properly aligned before they are joined to form a unitary body part, and the construction should be such as to permit such alignment before the tube parts are sealed together. Further, the construction should be such as to provide a strong and secure sealed joint between the parts which will stand up under the expansion and contraction of the parts when the tube is heated-up and cooled-off during its operation in a television set.

It has heretofore been customary to, in effect, fuse the glass face plate on a mouth, rim or lip flange of the color treated part, as by making the edges of the face plate molten and the corresponding edges of the glass part molten. In black and white tubes employing a metal body, it has been customary to heat the metal of the metal body until the edge of the face plate becomes molten in order to secure a joint therebetween. In this connection, it has been customary to use a special metal for the body, such as stainless steel, which has a coefficient of expansion closely approximating that of the glass face plate, in order that a good seal may be maintained.

I have determined that the problem of constructing a suitable metal body for a color tube is much more complex than for a black and white tube, due to the two part construction and the special color processing, etc., required for the one part which may be termed a rim part, and due to the need for providing a good sealed-off and secure joint between the main body or funnel part and the rim part. It was first thought that if a metal rim part could be successfully utilized with a glass main body or funnel part, that a great improvement would be accomplished, in that a so-called rectangular type of composite tube construction could be provided and the difficulties of making and processing a glass rim part could be eliminated. However, the question of a proper seal or joint between the glass funnel part and the metal rim part was presented and also the factor of using an expensive and relatively hard metal, such as stainless steel in forming such a part was presented.

I thus felt that a still greater advance could be made and a more competitive and practical type of tube envelope could be provided if I could form the entire body construction of metal material, preferably of a more easily worked and less expensive metal than stainless steel. In this connection, glass bodies for such a purpose have to be of relatively heavy thickness and of a fairly good quality of glass in order to withstand the pressure set up in the utilization of the tube. It is well known that glass is relatively strong in compression, but weak in tension and that the vacuum induced in the tube tends to cause considerable pull-in tension in its walls and give rise to the danger of implosion. Another important factor in devising a solution to the problem has been the fact that the demand as to color tubes is for those of relatively large screen sizes, starting with about 19 to 20 inches and larger, for example, up to 26 to 30 inches or more.

It is thus an object of my invention to devise a solution to the problem involved in producing color television tubes;

It has also been an object of my invention to provide an improved multi-part television or cathode ray tube or envelope and particularly, to provide one which is at least in part of metal construction;

Another object of my invention has been to provide a new and improved television body construction which is particularly suitable for use of metal materials;

A further object of my invention has been to produce an improved tube envelope which in construction will be suitable for color utilization and which will fully meet factors involved in such a utilization in an effective manner;

A still further object has been to provide new and improved procedure for making a multi-part television tube and particularly, a multi-part tube at least one of whose body parts is of metal construction;

These and other objects of my invention will appear to those skilled in the art from the illustrated procedure and the appended claims.

In the drawings, FIGURE 1 is a top plan view of a rectangular color television tube constructed of metal in accordance with my invention.

Figure 1:
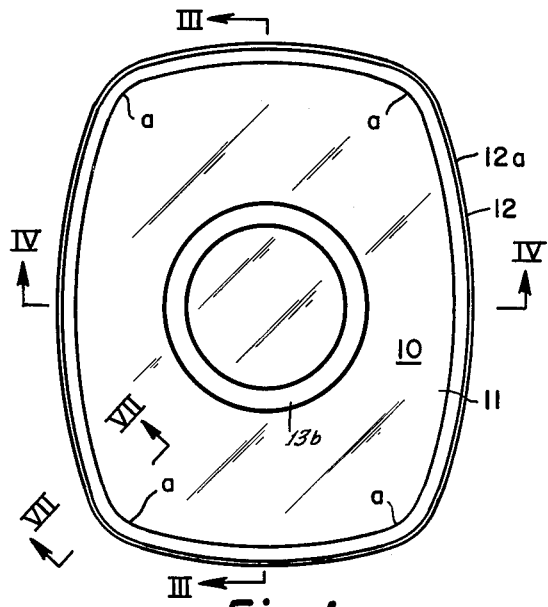
Figure 3:
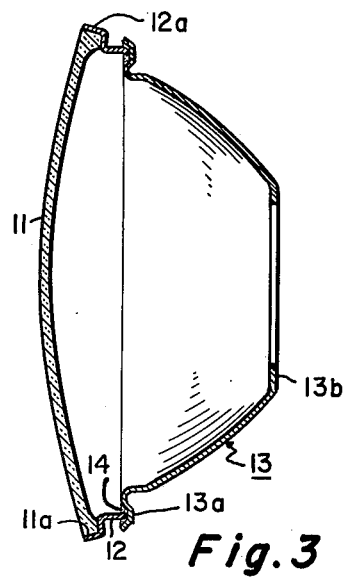
FIGURE 3 is a side sectional view in elevation taken along the wider side of the tube on line III—III of FIGURE 1.
Figure 2:
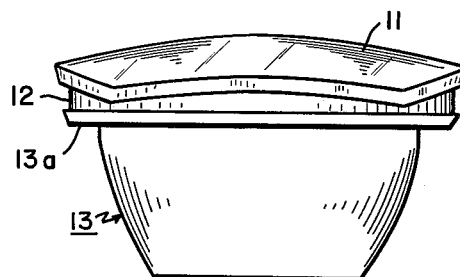
FIGURE 2 is an end view in elevation of the narrow side or end of the tube of FIGURE 1.
Figure 4:
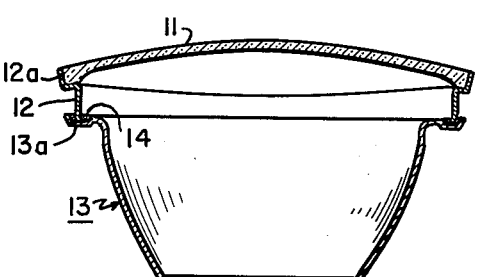
FIGURE 4 is a narrow side or end section in elevation, taken along line IV—IV of FIGURE 1; it will be noted that FIGURES 1 to 4 are drawn to the same scale.
Figure 5:
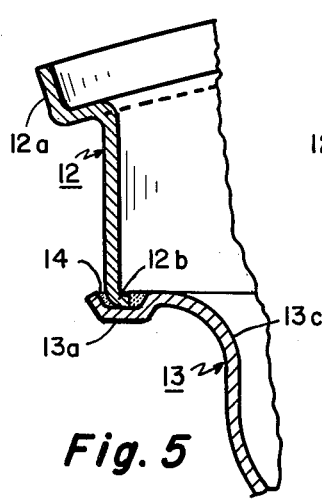
Figures 6, 7:
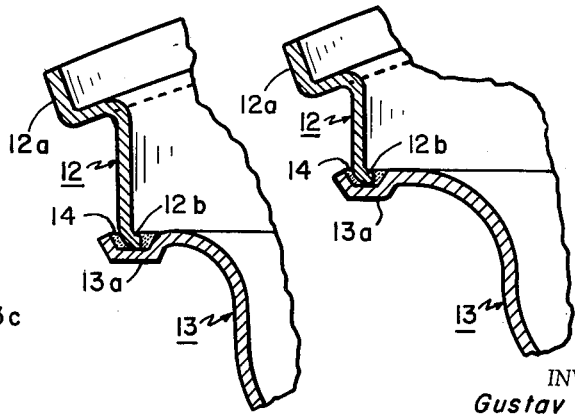

FIGURES 5, 6 and 7 are enlarged fragmental sections in elevation of the tube of FIGURE 1 with its face plate removed and along different axes of the tube; in this connection, FIGURE 5 is taken along the minor axis of FIGURE 4, FIGURE 6 is taken along the major axis of FIGURE 3, and FIGURE 7 is taken along a diagonal axis as represented by line VII—VII of FIGURE 1. In these figures, the mask has been omitted for purpose of clarity; they illustrate the relationship of rim and funnel parts of the body after the mask has been inserted, first for joining the two parts has been added, the two parts have been accurately aligned in jigs, and the parts have been joined together by fusing the frit.

Figure 8:
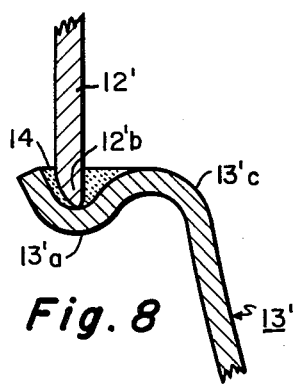
Figure 9:
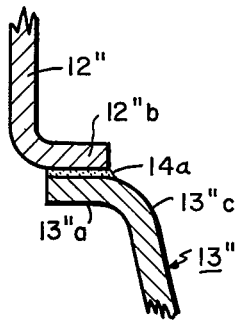

FIGURES 8 and 9 are still further enlarged vertical sections showing modified forms of joint constructions between rim and funnel parts of a television tube; in FIGURE 8, the connecting flange of the rim part fits within a grooved flange of the funnel part, and in FIGURE 9 the connecting flanges of the two parts are in a substantially planar, opposed, face-to-face relation with each other and extend substantially at right angles to the longitudinal axis of the cone body.

Figure 10:
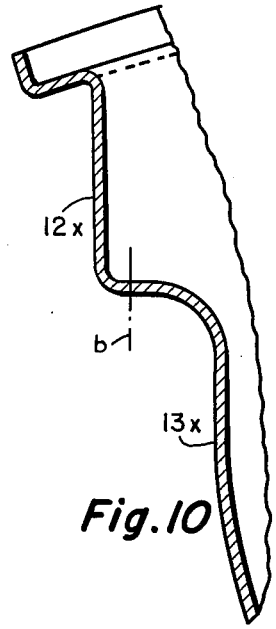

FIGURE 10 is a sectional view in elevation on a slightly smaller scale than FIGURES 5 to 7, inclusive, illustrating that a metal tube may be formed in accordance with my invention from a single blank or piece of metal.

Figure 11:
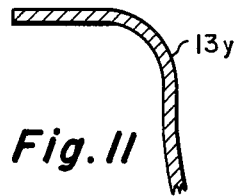
Figure 12:
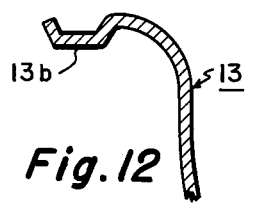

FIGURES 11 and 12 are fragmental sections in elevation on the scale of FIGURE 10 illustrating further steps in forming a funnel part from the one-piece construction of FIGURE 10.

Figure 13:
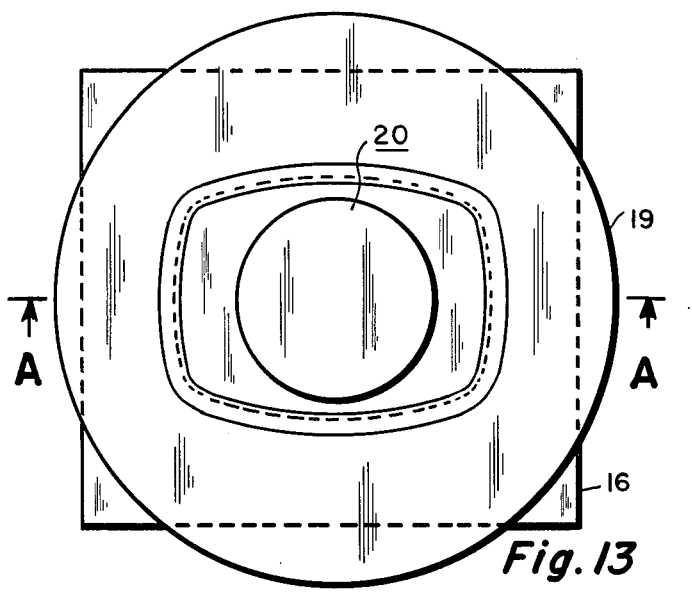

FIGURE 13 is a top plan view of apparatus for carrying out a draw forming operation upon a partially formed metal shape that has been preliminarily formed in a manner indicated by FIGURES 8A to 10B of the Hempel Patent No. 2,825,129, using equipment of the type there illustrated.

Figure 14:
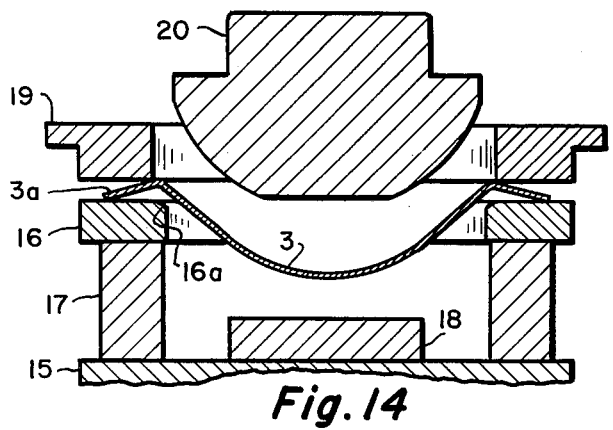

FIGURE 14 is a sectional view in elevation taken along line A—A of FIGURE 13, illustrating the apparatus in a ready position for carrying out a forming operation employed in producing a complete rim part, such as illustrated in FIGURES 3 and 4.

Figure 15:
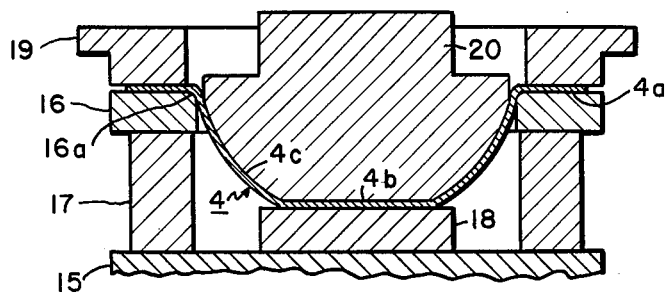

FIGURE 15 is a view similar to FIGURE 14 illustrating the completion of a forming operation accomplished by the apparatus of FIGURE 14, in accordance with which a top or mouth flange of the shape is flattened and its side walls are elongated.

Figure 16:
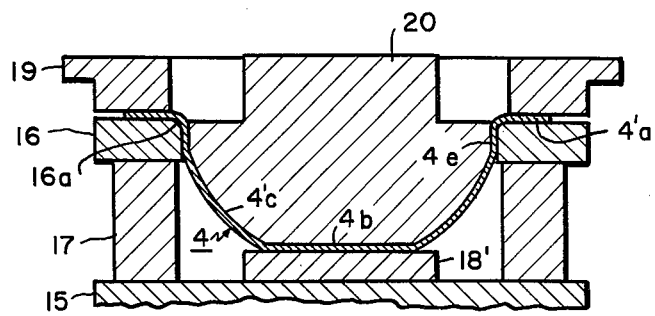

FIGURE 16 is a view similar to FIGURE 15, but illustrating the completion of a restriking operation wherein the mouth flange is further shortened and its side walls are further elongated; it involves the use of a bottom die of lesser extent or thickness.

Figure 17:
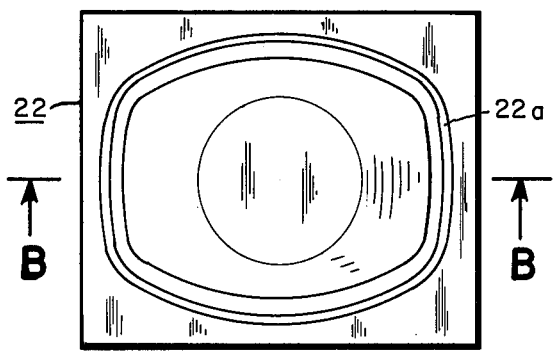
Figure 18:
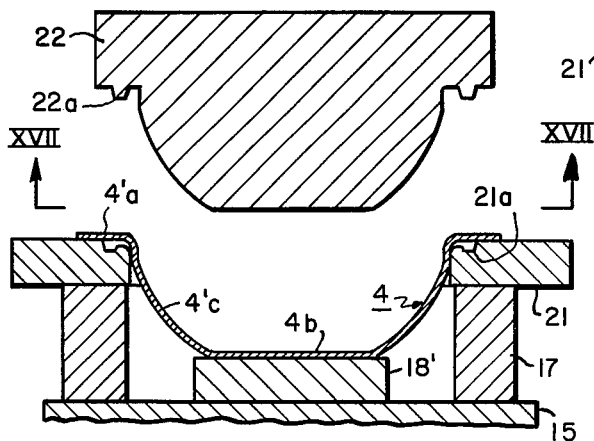

FIGURE 17 is a bottom plan view of apparatus for further forming the metal shape that is provided by the operation of FIGURE 16 and is taken along the line XVII—XVII of FIGURE 18.

FIGURE 18 is a section in elevation taken along line B—B of FIGURE 17 showing the metal shape produced by the operation of FIGURE 16 in position for forming its mouth flange.

Figure 19:
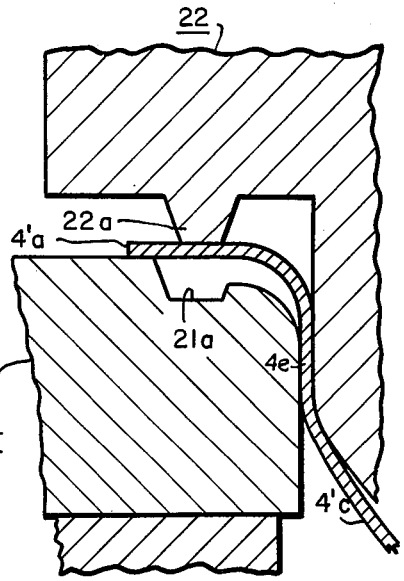

FIGURE 19 is a greatly enlarged fragmental section illustrating the beginning of the forming of the mouth flange.

Figure 20:
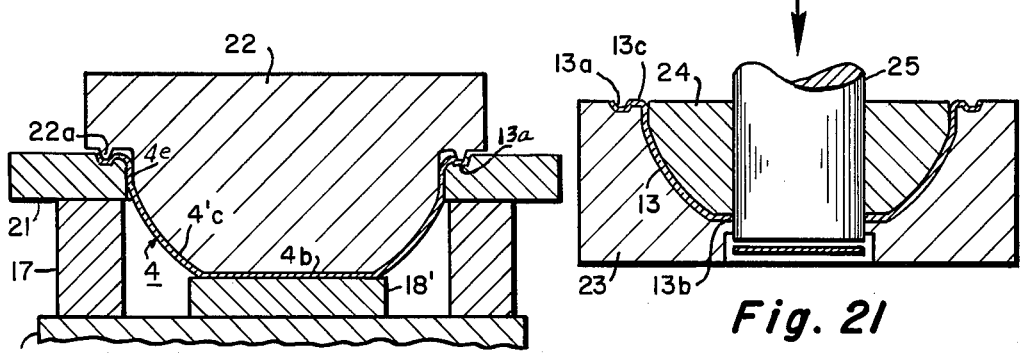

FIGURE 20 is a sectional view in elevation of the apparatus of FIGURES 17 and 18 taken along the line B—B, illustrating the completion of the forming of the mouth flange of the metal shape.

Figure 21:
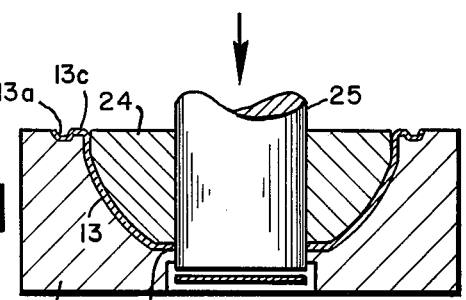

FIGURE 21 is a sectional view in elevation showing apparatus for punching out a bottom opening or hole in the metal shape of FIGURE 20 to form a complete funnel part, such as illustrated in FIGURES 3 and 4.

It will be noted that FIGURES 14 to 21, inclusive, illustrate steps involved in forming a funnel part and that FIGURES 22 to 29, inclusive, illustrate steps involved in forming a rim part of a television cone in accordance with my invention.

Figure 22:
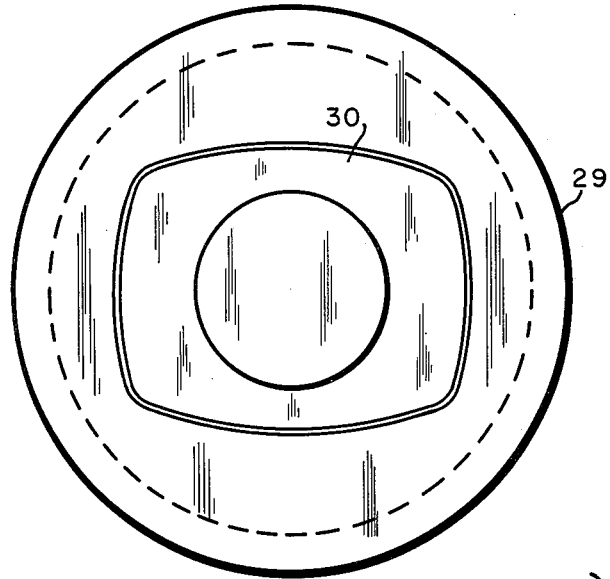

FIGURE 22 is a top plan view of apparatus for forming a preliminary rim shape from a metal blank.

Figure 23:
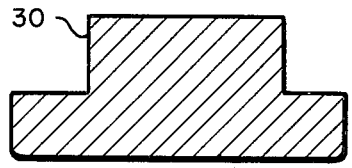
Figure 23:
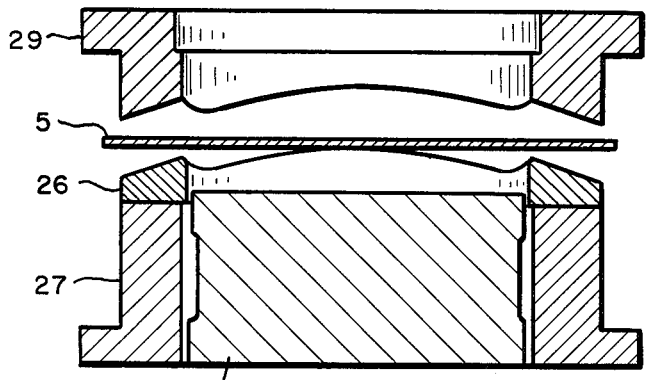

FIGURE 23 is a sectional view in elevation of the apparatus of FIGURE 22 showing the blank in position ready for its initial forming operation.

Figure 24A:
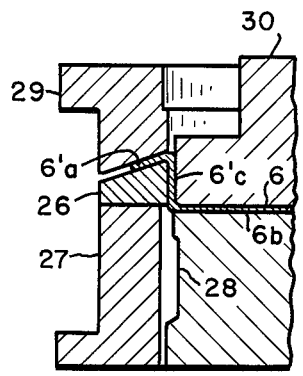
Figure 24:
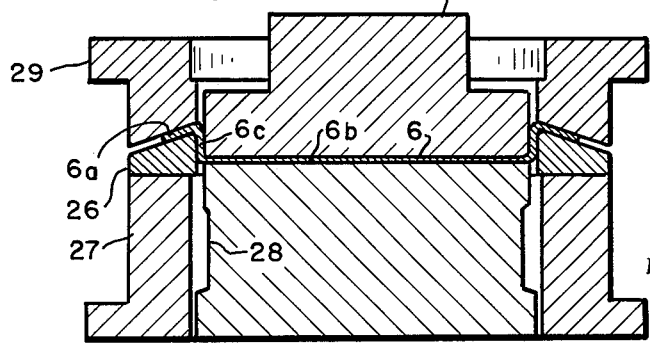

FIGURE 24 is a sectional view in elevation on the scale of FIGURES 22 and 23 and illustrating the completion of the preliminary forming step, as accomplished by the apparatus of FIGURES 22 and 23.

FIGURE 24A is a fragmental section in elevation showing the apparatus of FIGURES 23 and 24 with its bottom die part slightly withdrawn, and after the completion of a restriking operation for elongating the side wall of the shape and shortening its mouth flange.

Figure 25:
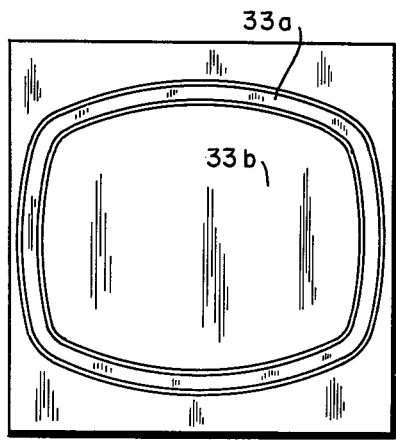
Figure 26:
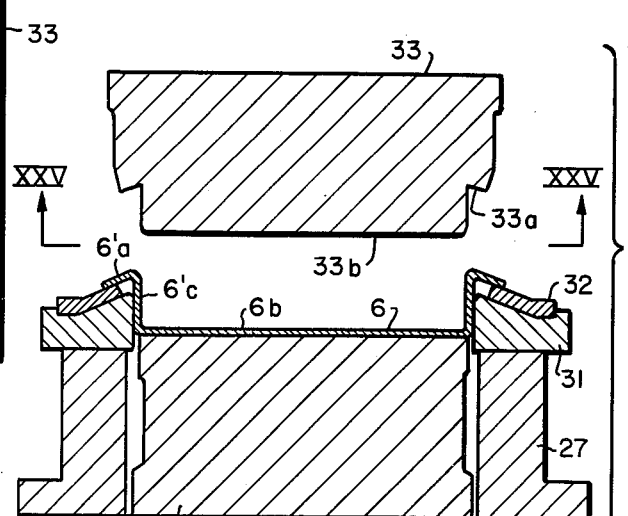

FIGURE 25 is a bottom plan view of apparatus of FIGURE 26, taken along the line XXV—XXV of such figure.

Figure 27:
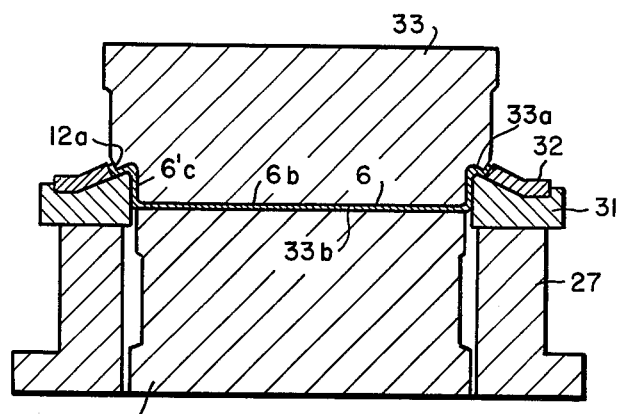

FIGURES 26 and 27 are sectional views in elevation on the scale of and of the apparatus of FIGURE 25, illustrating the step of finally forming the upper lip flange of the metal shape produced by the operation of FIGURE 24A.

Figure 28:
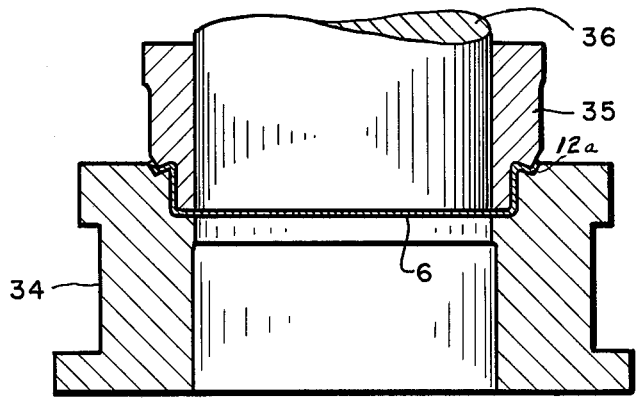

FIGURE 28 is a sectional view in elevation of apparatus for and illustrating the step for further forming the shape of FIGURE 27 and particularly of elongating its side wall by a restriking operation.

Figure 29:
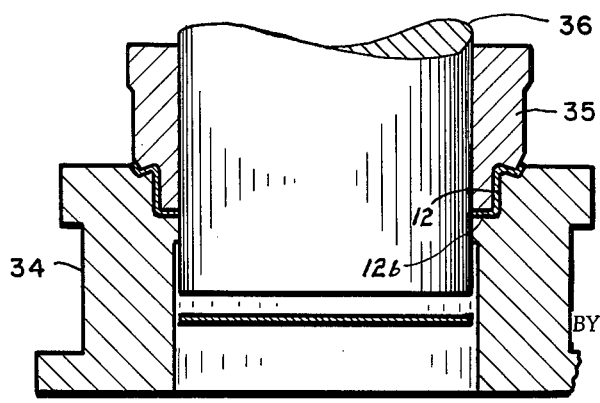

And, FIGURE 29 is a view similar to FIGURE 28 of the same apparatus, but illustrating its utilization in punching-out a bottom of the shape to produce the final rim part of FIGURES 3 and 4.

In carrying out my invention by meeting the factors and solving the problem involved, I have been able to provide a multipart television tube or cone of frustoconical rounded-rectangular shape as to its main body, mantle or funnel part and of rounded rectangular shape as to its rim body part. I have found that this can be accomplished employing any suitable metal, such as carbon steel or stainless steel, and of a suitable gauge. It, however, enables the use of an inexpensive metal, such as carbon steel and of relatively thin gauge, for example, of about $\frac{1}{16}$ or $\frac{3}{32}$ of an inch in thickness; thus, the expense involved can be minimized. In accordance with my invention, parts are produced whose flanges and lip or rim portions are of substantially the same thickness as its wall or body portions; it enables the effective sealing of joints between the rim and funnel parts as well as between the rim part and the glass face plate without damage to the parts and in such a manner as to provide a strong, overall, resultant, composite construction.

I have been able to form both a rim part and a mantle, funnel or main body part of metal from flat stock by a progressive series of metal stamping operations involving drawing, forming and restriking as well as piercing, all with a minimum of rejects and in such a manner as to produce desired shapes and requisite strength characteristics. Stress relieving anneals can be used as desired. Although, as above indicated, the body parts and particularly the rim part may be made of stainless steel, I have been able to, in accordance with my invention, eliminate the necessity for such a more expensive and harder steel and to obtain an effective sealed joint between the body parts by the use of a powdered glass frit having a fusing point of about 800° F. as a joining and sealing agency therebetween. Further, I have found that a desirable coefficient of expansion approximating the coefficient of expansion of a glass face plate of about 12 to $13.5 \times 10^{-7}$ can be obtained in a metal having a carbon content of up to about 1.0% and a small manganese content in the neighborhood of .40 to .50%.

Referring particularly to FIGURES 1 to 7, inclusive, of the drawings, I have illustrated a multi-part composite cathode ray, television tube, cone or envelope 10 suitable for color television utilization which has a rectangular glass face plate 11, a rim body part 12, and a funnel, mantle or main body part 13. The rim part 12 is of relatively short extent and has a vertical or longitudinal side wall, an upper or outer mouth flange, rim or lip 12a, and preferably, an in-turned or bent bottom or connector flange or lip 12b. The connector flange 12b is shaped on its inner face to permit an effective drain-off of each color as it is applied internally thereto and to, at the same time, provide an effective means for aligning and connecting it with the funnel part 13. As shown particularly in FIGURE 1, the lip 12a is of angular cross section, sloping or inclining slightly outwardly toward its outer edge. The lip and the side wall are of rounded or curvilinear rectangular shape; the lip is adapted to receive a rectangular glass face plate and is shown as having a wider radius $a$ at its corners that are closer to the center line than any other portions of the opposed narrower sides.

The funnel part 13 is shown of frusto-conical shape, and as having an upper connecting or mounting flange or lip 13a that defines a supporting shelf. The connector flange 13a has an inner forwardly-projecting rounded shoulder formed from side wall 13c, and an outwardly-sloped and forwardly-projecting edge which define a central annular depression, groove, gutter or recess therebetween for somewhat loosely-receiving the connector flange 12b of the rim part 12, so that the two parts can be accurately aligned in a jig before a suitable material, such as powdered glass frit represented by 14 is fused in position to form a fully sealed and effective joint between the two parts. The funnel part 13, in addition, is shown provided with a horizontal, inwardly-projecting or substantially planar or flat transverse flange 13b at its back end portion which serves as a neck mounting flange for a tube neck. The flange 13b extends about a centrally disposed opening in the back end of the funnel part. As previously indicated, the metal rim part 12 can be and is preferably employed with a metal funnel part 13, but can also be successfully employed with a glass funnel part, if desired.

In FIGURES 8 and 9, I have illustrated modified forms of connections between rim and funnel parts. In FIGURE 8, rim part 12' is shown provided with a substantially longitudinally or axially-extending connector flange 12'b whose outer edge is slightly beveled and which fits within the recess defined by connector flange 13'a of funnel part 13'. The shoulder formed from the side wall 13'c of this embodiment is of more uniformly rounded shape than the shoulder of the embodiment of FIGURE 5. In FIGURE 9, modified rim part 12'' has an inturned, substantially planar or flat transverse connector lip or flange 12''b which also permits color solution drain-off from the rim part during their application, but is not as effective in this connection as the embodiment of FIGURES 1 to 7 or the embodiment of FIGURE 8.

The connector flanges of FIGURES 5 and 9 are preferred, since at least a slight bend in the connector flange of the rim part 12 provides increased rigidity in the composite structure; the bend should extend transversely-inwardly and define at least a 90° included angle with the longitudinal axis of the side wall of the rim part. The modified funnel part 13'' of FIGURE 9 has an outwardly-projecting, flat connecting flange 13''a which lies in a substantially opposed, cooperating relation with the connecting flange 12''b; both extend transversely or at substantially right angles to the longitudinal axis of the body parts. The opposed faces of the flanges 12''b and 13''a may be secured and sealed by placing powdered frit therebetween, and heating the flanges to melt or fuse the frit to provide a final, fused frit seal 14a between their opposed faces. In this embodiment, the shoulder formed from the side wall 13''c is of more simple construction than in the embodiment of FIGURES 5 and 8.

By way of further illustration in FIGURE 10, I have shown a single metal piece which has been formed by stamping and drawing operations into a preliminary shape substantially corresponding to the desired final shapes of separate rim and funnel parts. In this connection, portion 12x represents the portion which is to become the rim part and portion 13x represents the portion which is to become the funnel part. Line b represents a line of shear or severance of the portions to provide the two parts. In this connection, it will be noted that after severance, the rim part may be used in its as-formed shape, while the funnel part may be used in substantially its formed shape, if the type of joint of FIGURE 9 is to be employed. Its connector flange 13b may be further formed, as indicated by FIGURES 11 and 12, to provide the type of connector flange construction of FIGURE 5, see the operations illustrated in FIGURES 16, 18, 19 and 20 of the drawings. As to FIGURE 11, the funnel shape 13y, is the shape resulting from a flattening of the severed flange of the portion 13x, as may be accomplished by an operation illustrated in FIGURE 15. If the type of connector flange 13b of FIGURE 12 is to be formed, then the flange of FIGURE 11 may be shortened in the manner indicated by FIGURE 16 of the drawings.

In separately forming a rim part in accordance with my invention, I start with a thin metal blank produced from a sheet or strip piece of metal and preliminarily form it in the same manner as illustrated by FIGURES 8A to 10B of and as described in Patent No. 2,825,129. This produces a dished shape 3, as shown in FIGURE 14, which has a somewhat rounded, but shallow wall body and a lip flange 3a that is inclined outwardly-downwardly therefrom. It will be noted that the preliminary drawing operations are relatively shallow operations.

In the step made possible by utilization of the apparatus of FIGURES 13 and 14 and as accomplished in the manner of FIGURE 15, the body of the shape 3 is further drawn or elongated, its base or back end wall is flattened, and its forward flange is flattened to produce the secondary shape 4. The secondary shape 4 has a flattened top or forward flange 4a, a frusto-conical, rounded, longitudinally-extending, side wall 4c, and a flattened back end wall 4b. This is accomplished by positioning the blank 3, as shown in FIGURE 14, with its flange 3a on an upper ring or female die part 16 and between its upper face and the lower face of a blank hold-down 19. It will be noted that the ring or female die 16 is provided with a rounded-off inner forward edge 16a to round-off the connection between the side wall 4c and the flange 4a. This operation is accomplished by moving the hold-down 19 towards the face of the die 16. At the same time, a rigid punch or die plunger 20 is moved centrally downwardly through the die 16 and into a cooperating forming relation with a bottom or back-up die 18. A base support or stand 15 carries the bottom die 18 and a connecting support 17 for the ring die 16.

To further elongate and form the side wall 4c of the secondary shape 4, I employ a restriking operation, using the same apparatus as in the operation of FIGURE 15, except that a bottom or back-up die part 18' of lesser thickness or extent is employed, see FIGURE 16. The operation of FIGURE 16 accomplishes a shortening of the flange 4a to form flange 4'a, in that a down movement of the punch 20 causes a slight drawing-in of the flange between the hold-down 19 and the die 16. This operation simultaneously accomplishes an elongation of the side wall 4c to form side wall 4'c and a substantially cylindrical wall area 4e. By the operation of FIGURE 16, I provide the secondary shape 4 with substantially the final wall dimension of the final funnel part 13 which is to be produced.

By operations illustrated in FIGURES 17 to 20, I form a final connector flange 13a from the flange 4'a. The same die apparatus is employed as in FIGURE 16, except that a substitute upper ring die part 21 having a recess 21a and a punch rigid male die 22 having a projecting annulus 22a are employed. As shown particularly in FIGURES 19 and 20, the resultant or tertiary shape produced by the operation, forms a final connector lip or flange 13a from the flange 4'a. In FIGURE 21, I have shown apparatus which consists of a female die part 23, a core or plug die part 24 and a piercing punch 25. In accordance with this step, the metal shape is held clamped between the die parts 23 and 24 while the piercing punch 25 is moved downwardly to pierce a hole centrally and produce neck or bottom flange 13b of the funnel part 13, thus completing the formation of such part.

In FIGURES 22 to 27, I have illustrated apparatus and procedure for forming a rim part 12 from a flat metal blank or piece 5. As shown, a support 27 carries a ring die 26 which has an upper contour corresponding to the desired rounded rectangular contour that is to be produced in the lip and side wall of the shape. A lip or flange forming hold-down die 29 cooperates with the ring die 26 and with a rigid male punch or die 30 to, as shown in FIGURES 23 and 24, form a primary shape 6 from the blank 5 that has a downwardly-outwardly inclined flange 6a, a substantially longitudinally straight side wall 6c, and a substantially flat back or bottom wall 6b. It will be noted that like the preliminary shape of the funnel part, the preliminary shape of the rim part is provided with a flange 6a that has an outward slope and in this case, a slope of about 18° is satisfactory.

In the operation of FIGURE 24A, the primary shape 6 is restruck, using the same apparatus as in FIGURES 23 and 24, but withdrawing the die 28 slightly in order to simultaneously produce an elongated side wall 6'c and a shortened flange 6'a.

In the apparatus of FIGURES 25 to 27 and the operation thereby illustrated, the preliminary shape 6 is provided with its final lip or flange 12a. The preliminary shape 6 is carried on a modified form of ring die 31 which is positioned on the support 27 and which cooperates with the bottom die 28 of the operation of FIGURE 24. The final lip edge 12a of the rim part 12 is formed by the cooperative action of a rigid punch male die 33 and its projecting annular edge 33a with an upper, outwardly-downwardly sloped face of the ring die 31 and with a cooperating forwardly-extending end face of a supported, supplemental, inset-fitted ring die 32.

FIGURES 28 and 29 show further apparatus for finally forming the rim part 12 from the blank 6. This apparatus includes a female die 34, a cooperating sleeve die 35 and a piercing punch 36. In the operation of FIGURE 28, the shape 6 is, in effect, restruck by the combined substantially endwise-flush down movement of the die 35 and the punch 36 to elongate the shape to its final desired length. In the operation of FIGURE 29, the shape is punched out centrally by further and relative movement of the punch 36 with respect to the dies 34 and 35 to provide the final rim part 12 and its back or neck flange 12b.

Irrespective of whether a metal is used having a coefficient of expansion substantially corresponding to the coefficient of expansion of a glass funnel part or a glass face part that may be used in forming a composite envelope, tube or cone construction, I have found that the use of a fused frit joint between the body parts of the tube, itself, gives strength to the connection and particularly, where the rim or flange parts that are being joined have a fit that permits some relative transverse motion between them. Such a fit, of course, is also important from the standpoint of properly longitudinally-axially aligning the parts before they are secured or fused together to form a unitary cone or body part.

An important feature of my construction is the provision of connector flanges between the rim and funnel parts such that they can be transversely-slidably, accurately-aligned with respect to each other and then secured in such an aligned relation by fusing glass frit between their opposed or associated faces or edge portions.

As noted from FIGURES 5 to 7 of the drawings, the side wall of the funnel or mantle part 13 has a curvature at its forward end such that it slopes outwardly to the connector flange 13a. This provides a flexible relation of the connector flange 13a and with respect to the connector flange 12b, such that when the parts are placed in jigs and the frit 14 is heated up and fused, the expansion of the flange 13a at the joint is somewhat exaggerated from the standpoint of the connector flange 12b of the rim part 12, and as the joint cools to solidify the frit, the connector flange 13a in contracting more than the flange 12b, in effect, places the sealing material under compression between the flanges 12b and 13a in its sealing relation. The transversely-adjustable or slidable relation between the connector flanges 12b and 13a further assures this type of action, in that it permits relative movement between the flanges. The compressed condition is retained even when the tube envelope is heated-up and cooled during its normal operation at which time the temperatures are well below the fusing temperature. The double angle section of the lip edge construction 12a of the rim part 12 has been found to be advantageous in providing flexibility of compression-retention of the face plate 11 during the operation of the tube or envelope.

While I have shown preferred embodiments of my invention, it will be understood that various changes may be made in the procedure employed and in the construction and utilization of the structure involved by those skilled in the art without departing from the spirit and scope of the invention as defined in the claims.

What I claim is:

1. A rim part of metal construction for carrying a relatively large rectangular glass face plate of a multi-part cathode ray tube envelope that is suitable for color television usage which comprises, an open-end side wall of rounded rectangular shape having an in-turned connector flange at its back end that defines at least a 90° included angle with respect to the longitudinal axis of said side wall, a surmounting lip-flange extending from the front end of said side wall for receiving the glass face plate, said lip flange having a transverse flange portion that projects outwardly and inclines backwardly from the forward end of said side wall, said lip flange having a forwardly-extending and backwardly-sloped end flange portion connected to and projecting from the outer extremity of said transverse flange portion, said transverse and end flange portions defining a dual angular section that slopes away from and projects outwardly from said side wall, and said side wall and said connector flange and said lip flange having a substantially uniform wall thickness throughout.

2. A multi-part cathode ray tube envelope suitable for color television usage and for carrying a relatively large rectangular glass face plate which comprises, an open-end funnel part having a side wall of generally frusto-conical rounded rectangular shape that is provided with a neck flange at a back end thereof surrounding an opening therethrough, said side wall having a connector flange at its forward end projecting transversely-outwardly therefrom and connected thereto by an outwardly-curved wall portion; an open-end rim part of metal construction having a side wall of rounded rectangular shape, the side wall of said rim part having a connector flange at its back end cooperating with the connector flange of said funnel part and having a transversely-slidable interfitting relation with respect thereto for aligning said parts with each other, said rim part having a surmounting forwardly-outwardly projecting lip flange extending from its front end of substantially dual angular section and of rounded rectangulare shape to receive the face plate, said lip flange having a transverse flange portion connected to the side wall of said rim part and projecting radially-outwardly and in a backwardly-sloped angular relation with respect thereto, and said lip flange having an end flange portion projecting forwardly in a backwardly-sloped relation from the outer extremity of said transverse flange portion, all in such a manner as to define a dual angular section with the side wall of said rim part.

3. A multi-part cathode ray tube envelope as defined in claim 2 wherein, the connector flange of said funnel part extends transversely-outwardly from the forward end of the side wall thereto and has an annular recess therealong of curved section to receive the connector flange of said rim part, the connector flange of said rim part extends substantially longitudinally of its side wall and has an outer beveled edge that is substantially complementary with the curvature of an outer face of said annular recess of the connector flange of said funnel part, and the connector flange of said rim part is of lesser thickness than the width of said annular recess whereby the connector flange has a transversely-adjustable positioning within said annular recess.

4. A multi-part cathode ray tube envelope as defined in claim 2 wherein, the connector flange of said rim part extends transversely-inwardly from its side wall, and the connector flange of said funnel part has a forwardly-open annular recess of greater transverse width than the transverse extent of the connector flange of said rim part to transversely-adjustably position it therein.

5. A multi-part cathode ray tube envelope as defined in claim 4 wherein fused frit substantially fills said annular recess and extends continuously along the joint defined between the connector flanges of said funnel and rim parts to secure and seal them together.

6. A multi-part cathode ray tube envelope as defined in claim 5 wherein said funnel and rim parts are of metal construction of about $1/16$ to $1/32$ of an inch in thickness and have a substantially uniform wall thickness throughout.

7. A multi-part cathode ray tube envelope suitable for color television usage and for carrying a relatively large substantially rectangular glass face plate which comprises, an open-end funnel part having a generally frusto-conical rounded rectangular side wall provided with a back end neck flange and a forward end connector flange that is connected by an outwardly-curved wall portion to the side wall and that projects transversely-outwardly therefrom, a rim part of metal construction having a side wall of substantially uniform wall thickness and having a back end connector flange and a forward end lip flange of substantially the same uniform thickness as the side wall, said lip flange having a dual angular section that projects transversely-outwardly from the side wall of said rim part in a backwardly-sloped angular and forwardly-extending relation with respect thereto, the connector flange of said rim part having a transversely-adjustably-interfitting positioning with respect to the connector flange of said funnel part, fused frit interposed continuously and substantially uniformly between the connector flanges for joining them and sealing them off with respect to each other along the full extent of the joint therebetween and in an adjusted aligned relation with respect to each other, and the lip flange of said rim part having a substantially rounded rectangular shape to receive the face plate.

8. A multi-part cathode ray tube envelope suitable for color television usage and for carrying a large size rectangular glass face plate member which comprises, a metal funnel part of generally frusto-conical rounded rectangular shape having a substantially uniform wall thickness, said funnel part having a side wall of open end construction provided with a forward connecting flange extending thereabout and projecting transversely therefrom of substantially the same wall thickness as the side wall and connected to the side wall by an outwardly curved portion, a metal rim part having a side wall of open-end construction and substantialy rounded rectangular shape that terminates at its back end in a transversely-inwardly projecting connector flange for cooperative transversely-slidable positioning with respect to the connector flange of said funnel part, said rim part having a forward lip flange projecting forwardly-outwardly therefrom of rounded rectangular shape to receive the glass face plate member, said forward lip flange being of dual angular cross section as defined by an outwardly-extending and backwardly sloped transverse flange portion projecting from the side wall and by a forwardly-projecting and outwardly sloped end flange portion connected to the outer periphery of said transverse flange portion, and sealing means having strength in compression and being fusible at a temperature of 800° F. that cooperates with the connector flanges of said rim and funnel parts for securely sealing them in a longitudinally and transversely aligned relation with each other and securely from the standpoint of heat expansion and contraction of the envelope during its utilization.

9. A multi-part cathode ray tube as defined in claim 8 wherein, said rim and funnel parts are of carbon steel of substantially uniform wall thickness within a range of about $1/16$ to $3/32$ of an inch, and said steel has a carbon content of up to about 1% and a manganese content of about .40 to .50%.

10. A multi-part cathode ray tube as defined in claim 8 wherein, said sealing means is fused glass frit powder, said funnel and rim parts are both of thin wall steel construction, the connector flange of said funnel part has an upwardly-open annular recess portion of greater transverse extent than the connector flange of said rim part for transversely-adjustably-receiving the connector flange of said rim part therein, and said annular recess portion receives and retains the glass frit powder therein until it is fused for securely sealing the connector flanges with each other.

References Cited by the Examiner

UNITED STATES PATENTS

| 2,144,820 | 1/1939 | Thomas | 220—10 |
|---|---|---|---|
| 2,173,473 | 9/1939 | Edwards | 220—2.3 X |
| 2,332,175 | 10/1943 | Sinclair | 29—539 |
| 2,457,144 | 12/1948 | Goodale | 220—2.3 X |
| 2,506,687 | 5/1950 | Scherrer | 220—2.3 X |
| 2,562,163 | 7/1951 | Hiensch et al. | |
| 2,635,205 | 4/1953 | Olson | 220—2.3 X |
| 2,682,620 | 6/1954 | Sanford. | |
| 2,727,172 | 12/1955 | Mark et al. | |
| 2,782,953 | 2/1957 | Koch et al. | 200—2.3 |
| 2,793,311 | 5/1957 | Thomas. | |
| 2,801,355 | 7/1957 | Nunan. | |
| 2,817,456 | 12/1957 | Seelen | 220—2.3 |
| 2,818,524 | 12/1957 | Smith et al. | |
| 2,825,129 | 3/1958 | Hempel | 29—539 |
| 2,836,751 | 5/1958 | Turnbull et al. | |
| 2,855,529 | 10/1958 | Morrell. | |
| 3,002,645 | 10/1961 | Kegg | 220—2.1 |

THERON E. CONDON, *Primary Examiner.*

GEORGE O. RALSTON, *Examiner.*